W. BARBER.
EXPLOSIVE ENGINE.
APPLICATION FILED JUNE 3, 1915. RENEWED JUNE 5, 1920.
1,346,805.
Patented July 20, 1920.
5 SHEETS—SHEET 1.
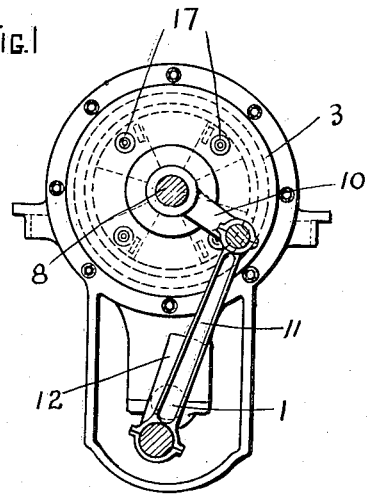
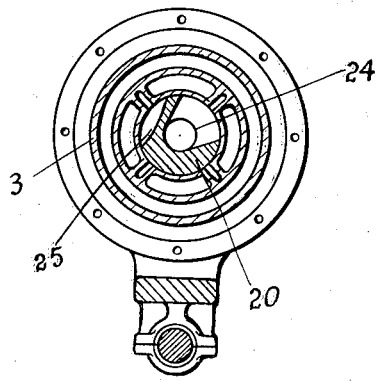
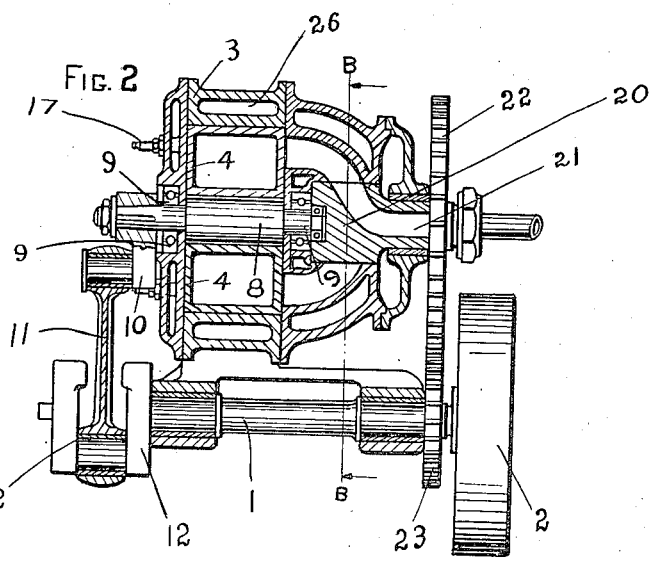
INVENTOR
William Barber
BY Samuel E. Darby
his ATTORNEY

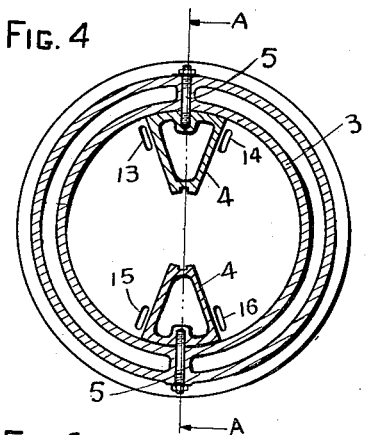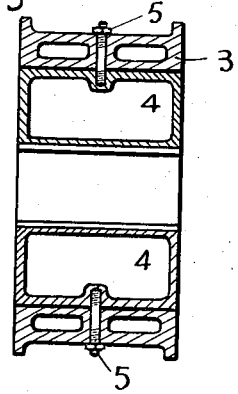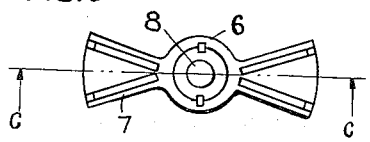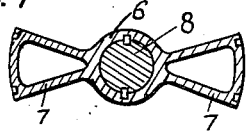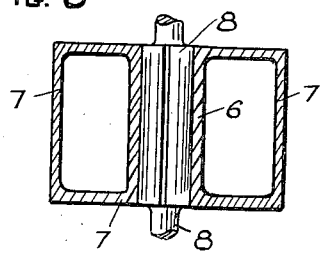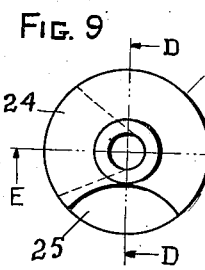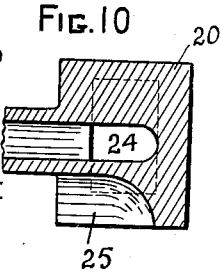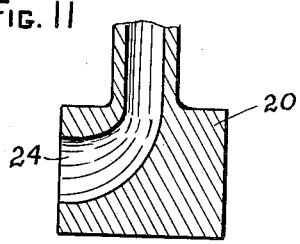

W. BARBER.
EXPLOSIVE ENGINE.
APPLICATION FILED JUNE 3, 1915. RENEWED JUNE 5, 1920.

1,346,805.

Patented July 20, 1920.

INVENTOR
William Barber
BY
Samuel E Darby
his ATTORNEY

W. BARBER.
EXPLOSIVE ENGINE.
APPLICATION FILED JUNE 3, 1915. RENEWED JUNE 5, 1920.
1,346,805.
Patented July 20, 1920.
5 SHEETS—SHEET 4.
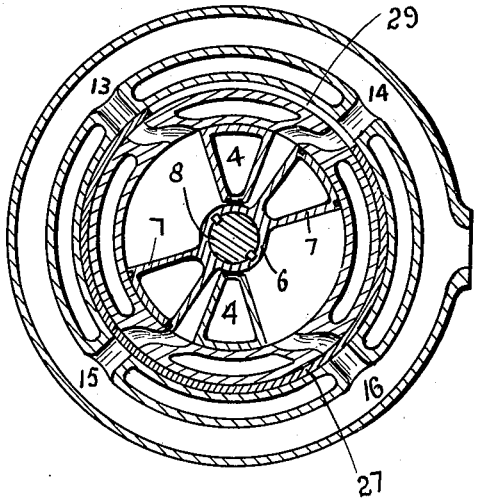
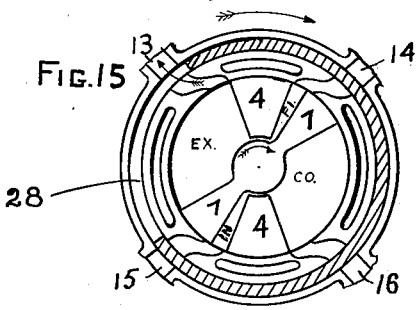
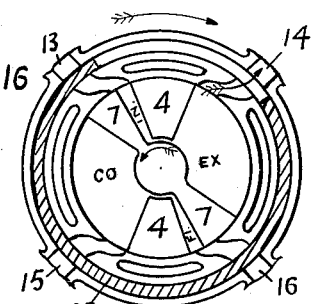
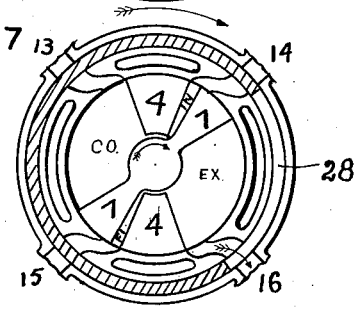
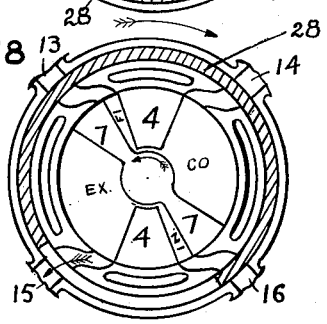
INVENTOR
William Barber
BY
Samuel E. Darby
ATTORNEY

UNITED STATES PATENT OFFICE.

WILLIAM BARBER, OF NEW YORK, N. Y.

EXPLOSIVE-ENGINE.

1,346,805.

Specification of Letters Patent.   Patented July 20, 1920.

Application filed June 3, 1915, Serial No. 31,862.  Renewed June 5, 1920.  Serial No. 386,919.

*To all whom it may concern:*

Be it known that I, WILLIAM BARBER, a citizen of the United States, residing at New York, county of Kings, State of New York, have made a certain new and useful Invention in Explosive-Engines, of which the following is a specification.

This invention relates to explosive engines, and particularly to the internal combustion engine.

The object of the invention is to provide an engine, each cylinder of which can accomplish the work of a plurality of cylinders of the well known reciprocating piston engines.

A further object of the invention is to provide an engine of the class described each cylinder of which is provided with a single oscillating piston and means to convert the oscillatory motion of the piston into rotary motion at the main shaft.

A further object of the invention is to provide each single cylinder of the engine with four combustion chambers.

A further object of the invention is to provide a single valve and valve operating means for each cylinder which controls both the exhaust and the inlet of all of the combustion chambers.

Further objects of the invention will appear more fully hereinafter.

Referring to the drawings:—

Figure 1 is a view in end elevation of an engine embodying my invention, parts being shown in vertical section.

Fig. 2 is a view of the same in central longitudinal section, parts being shown in elevation.

Fig. 3 is a sectional view of the same corresponding with a section taken on line B—B, Fig. 2 and looking in the direction of the arrows.

Fig. 4 is an enlarged transverse sectional view of the cylinder of an engine embodying my invention.

Fig. 5 is a sectional view taken on line A—A Fig. 4, and looking in the direction of the arrows.

Fig. 6 is a view in end elevation of the oscillating piston employed in connection with my invention.

Fig. 7 is a sectional view of the same.

Fig. 8 is a view in section taken on the line C—C, Fig. 6 looking in the direction of the arrows.

Fig. 9 is a view in end elevation of one form of valve used in connection with my invention.

Fig. 10 is a view in section taken on the line D—D, Fig. 9 and looking in the direction of the arrows.

Fig. 11 is a view in section taken on the line E—E, Fig. 9 and looking in the direction of the arrows.

Fig. 14 is a sectional view of the cylinder corresponding to a section taken on the line A—A, Fig. 13.

Figs. 15, 16, 17 and 18 are diagrammatic views showing the position of the piston at the explosion period of each explosion chamber.

The same part is designated by the same reference numeral wherever it occurs throughout the several views.

Figure 12:
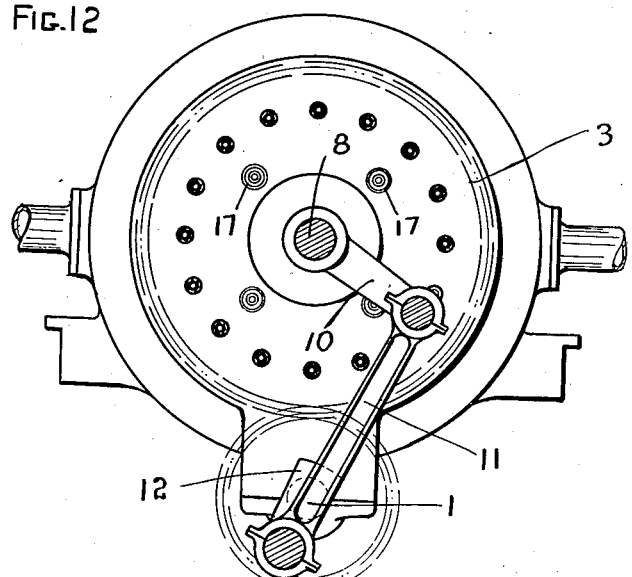
Fig. 12 is a view similar to Fig. 1 showing a modified arrangement of valve.
Figure 13:
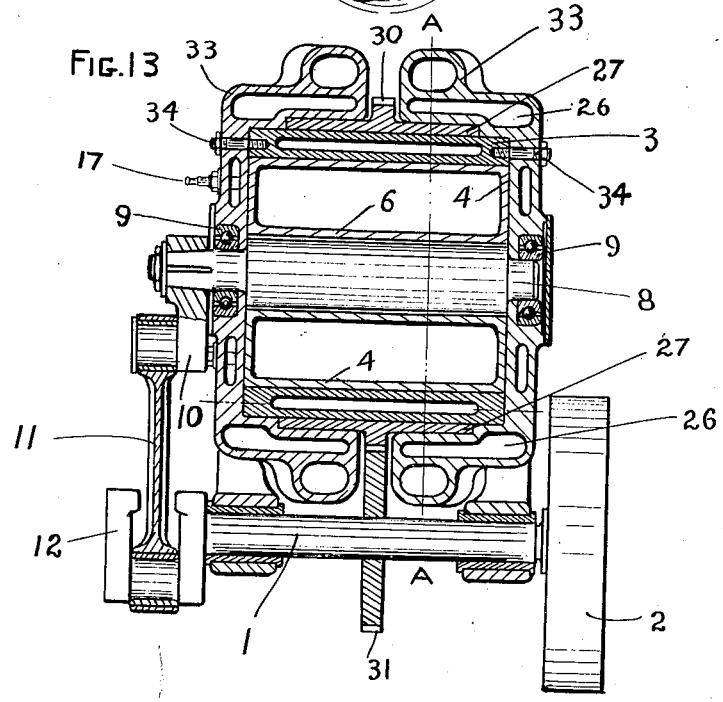
Fig. 13 is a view in central section of the same, parts being shown in elevation.

The invention consists substantially in the construction, combination, location and relative arrangement of parts and the operation of the same all as will be more fully hereinafter set forth, as shown in the accompanying drawings and finally pointed out in the appended claims.

In explosive, and more especially the internal combustion engines of the reciprocating piston type it is well known that for each two revolutions of the main shaft, each cylinder of the engine contributes one impulse as a result of the cycle of intake, compression explosion and exhaust in the common and well known manner. Thus, if added impulses per revolution of the main shaft are desired, added cylinders are required and so it is now common to have six and even eight cylinders connected to a common shaft to impart thereto, respectively, three or four impulses per revolution thereof. It is self evident, however, that the cost, weight, and labor is increased as the number of cylinders employed, and this, in consequence, is a serious detriment to the commercial value of an engine comprising a large number of cylinders.

It is among the special purposes of my present invention to provide an engine each cylinder of which imparts to the main shaft a plurality of impulses per revolution thereof and in this way in one form of my invention I supply a single cylinder and piston engine to accomplish the work of the present four cylinder engines or a two cylinder engine to accomplish the work of the present eight cylinder engines, thereby greatly diminishing the cost, labor, weight, material, and space of the engine without decreasing the efficiency thereof.

In accordance with my invention I provide the usual main or crank shaft 1, and fly wheel 2, with the cylinder of the engine, indicated at 3. Extending throughout the longitudinal length of the cylinder are vanes 4 suitably secured to the interior of the cylinder in any convenient manner such as by bolts 5, and are positioned diametrically opposite to each other. These vanes are preferably hollow and V-shaped slightly concave at their free ends to conform with the rounded portion 6 of the oscillating piston 7. The end of shaft 8 which carries the piston rests in suitable bearings 9 therefor to allow free oscillating motion. If desired, to reduce the weight of the piston to a minimum, or for cooling purposes, the same may be hollow, as shown. As shown in Figs. 6 and 7, the piston is provided with a vane on either side of the central or rounded portion 6. Keyed to the end of the shaft 8 of the piston is a crank arm 10 to which is connected connecting rod 11 the other end of which is connected to the main or crank shaft 1 by means of the crank arms 12. The piston is located inside of the cylinder and is positioned with respect to the internal vanes 4 as indicated in Fig. 14. It will be understood that the piston vanes oscillate between the cylinder vanes 4, and it will also be understood that by making the crank arms 12 of a definite proportion of the length of the crank arm 10 (see Figs. 1, 2, 12, and 19) the oscillating motion of the shaft or arm 8 is converted into positive rotary motion at shaft 1.

In this form of my invention as indicated in Figs 14, 15, 16, 17 and 18, the piston, together with the vanes 4 divide the cylinder into four chambers, each of which is provided with ports as indicated at 13, 14, 15, and 16, and a spark or igniting device in the usual manner.

To secure proper functioning of the four chambers and ports associated therewith, I provide a valve for each cylinder, said valve serving to control both the inlet and exhaust when opened and the compression when closed. Any suitable form or type of valve may be employed, and it will be understood that my invention, in its broad scope as defined in the claims is not to be limited or restricted to the specific structures that will be hereinafter described. In Figs. 1, 2 and 3, I employ a rotary valve 20 provided with a stem 21 upon which is mounted the gear wheel 22 which meshes with and is rotated by gear wheel 23 mounted on the main shaft 1. The gear wheels 22, 23, are of such sizes relative to each other to secure the proper opening and closing operations of the ports 13, 14, 15 and 16 at the proper time with respect to the oscillations of the piston 7, by means of revolutions of the main shaft 1. Detail views of this type of rotary valve are shown in Figs. 9, 10 and 11 wherein the inlet and exhaust port passages therein are shown at 24 and 25 respectively. As shown in Fig. 2, both the rotary valve casing and the cylinder 3 may be provided with ducts 26 to enable water cooling for the same if desired.

In Figs. 12 to 21, I have shown another form of valve as used in accordance with my invention. This form of sleeve valve 27, is shown in detail in Fig. 20 and consists of a cylindrical hollow casting provided with two openings 28, 29, one on either side of the center of the sleeve. Cast, keyed, or otherwise secured to the central portion of the sleeve valve 27 is a gear wheel 30 which meshes with and is actuated by gear wheel 31 mounted on and keyed to main shaft 1. The sleeve valve 27 is slipped over the cylinder 3 and held in place by the casing 33 which is secured to the cylinder by any suitable means such as by bolts 34. In this construction the casing 33 is provided with suitable bearings 9 for the shaft 8 of the oscillating piston 7.

Figure 19:
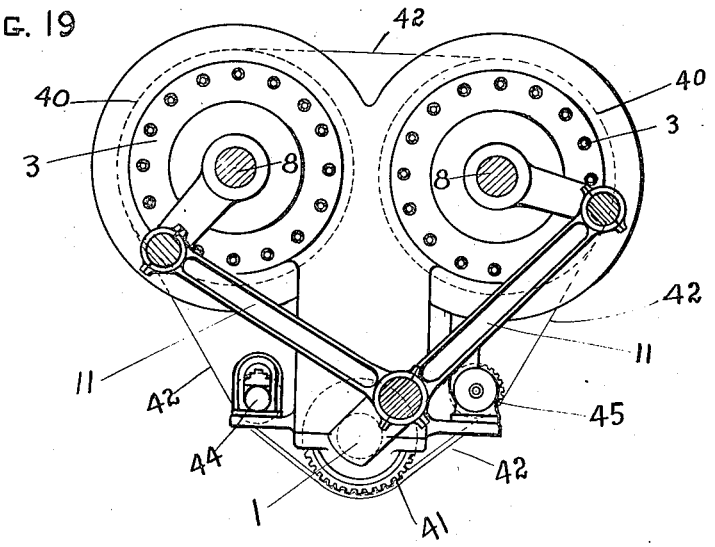
Fig. 19 is a view in end elevation of an engine embodying my invention comprising two cylinders.
Figure 20:
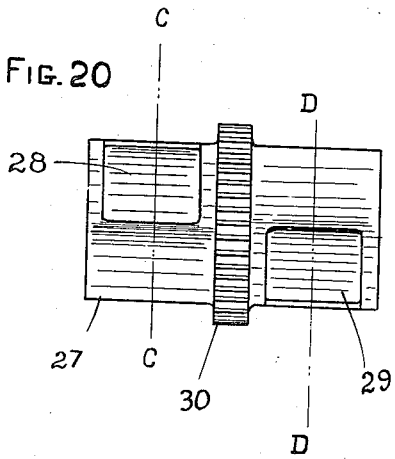
Fig. 20 is a view in side elevation of one form of valve employed in accordance with my invention.
Figure 21:
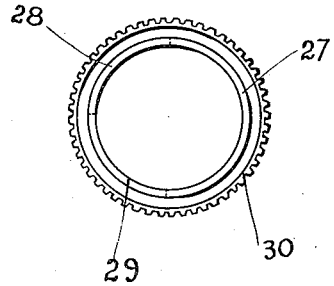
Fig. 21 is an end view of the same.

In Fig. 19, I have shown two cylinders of one casting wherein I am enabled to supply the main shaft 1 with four impulses per revolution. In addition, I employ in this construction a valve for each cylinder of the sleeve type hereinbefore described, as indicated by dotted lines at 40. A sprocket wheel 41 is mounted or keyed to the main shaft 1 and a sprocket chain 42 passes thereover and over the gear wheels 30 of the individual valves 40 so that both valves are simultaneously controlled by the main shaft 1. If desired, and as shown, this chain 42 may also actuate any number of auxiliary appliances, such as a pump 45 and a generator 44 by means of gear wheels attached thereto in a manner well known and understood in the art.

I will now describe the operation of the quadruple acting form of cylinder so that it may be clearly understood how one cylinder of an engine with an oscillating piston embodying my invention may impart two impulses to the main shaft per revolution thereof. To simplify the explanation, I will refer to Figs. 15 to 18, inclusive.

In these diagrammatic views, a sleeve valve is shown, but it will be understood that the operation is the same if a rotary or other type of valve is employed. In Figs. 15 to 18, the exhaust orifice 28 of the valve is the only orifice shown corresponding to a section taken on the valve as indicated at C—C, Fig. 20, while in Fig. 14, the valve is shown in section to disclose the inlet orifice 29 corresponding to a section taken on the valve at D—D, Fig. 20.

Assuming the piston and the valve to be in the position shown in Fig. 15, it will be noticed that the valve has just closed the port 15 to its respective chamber in the cylinder and at the same time port 13 is opened to exhaust. Fuel is under compression in the chamber marked F1, and is ignited, causing an explosion which causes the piston to move in the direction indicated by the arrow. At the same time the inlet orifice of the valve uncovers port 15, and its associated chamber in the cylinder. Also, in the chamber marked CO, fuel has just been drawn through port 16, so that the firing in chamber marked F1, as above stated, causes the piston to move, forcing exhaust or burnt fuel out of chamber marked EX through port 13, and at the same time draws in fresh fuel through port 15 into chamber marked 1N and compresses the fuel contained in chamber marked CO, and thus the piston and valve assume the position indicated by Fig. 16. Thus the fuel compressed in compartment CO, Fig. 15, is now fired, causing the piston to move again in the direction indicated by the small arrow, Fig. 16, thus compressing the fuel which the preceding stroke or oscillation of the piston sucked in through port 15, exhausting the burnt fuel through port 14, and the valve having moved in the direction indicated by the large arrow, and the inlet port thereof, having uncovered port 13, fuel is drawn into the chamber marked 1N, Fig. 16. The explosion having taken place, the piston is forced in the direction of the small arrow to the position indicated by Fig. 17. The fuel which was compressed in the last mentioned oscillation of the piston is then fired causing the piston to travel in the direction indicated by the small arrow, forcing the burnt fuel from chamber EX, through port 16, drawing in fuel through port 14, into chamber 1N and compressing the fuel in chamber CO, the piston and valve finally assuming the position indicated by Fig. 18. The fuel which was compressed by the last stroke or oscillation of the piston is then fired in chamber F1, causing the piston to move in the direction indicated by the small arrows, compressing the fuel contained in chamber CO, exhausting the burnt fuel from chamber EX through port 15, and drawing in fuel in chamber 1N through port 16, the piston finally assuming the position indicated by Fig. 15, and thus the cycle of operation is repeated as long as the engine is running.

While I have shown specific structures and have described the mode of operation of the same, it will be understood that many changes in details might readily occur to those skilled in the art without departing from the broad scope of my invention as defined in the claims, and having therefore set forth the objects and nature of my invention, and having described in detail means for accomplishing the same, what I claim as new and useful, and desire to secure by Letters Patent, is—

1. An internal combustion engine comprising a cylinder, an oscillating piston operating in said cylinder about the center thereof, means associated with said cylinder and said piston to divide said cylinder into at least 4 compartments whereby each of said compartments becomes successively a suction, compression, explosion and expansion compartment and a single valve to admit fuel into all of said compartments when each compartment in turn becomes a suction compartment.

2. An internal combustion engine comprising a cylinder, an oscillatory piston rotatively mounted at the center thereof in said cylinder, means coöperating with the ends of said oscillatory piston to form on opposite sides of each end, in successive order, a suction, compression, explosion and expansion chamber, a single valve to control the supply of explosive mixture to opposite sides of each end of said piston and to control the exhaust of the exploded mixture therefrom, a main shaft and means operated by said piston to rotate said shaft.

3. An internal combustion engine comprising a cylinder, an oscillatory piston mounted therein, vanes also mounted within said cylinder and coöperating with the piston to form separated chambers, whereby each of said chambers becomes successively the suction, compression, explosion and expansion chamber, a port communicating with each chamber, a single valve to control all of said ports to admit an explosive mixture to each chamber when the same becomes a suction chamber and means for exploding said mixture in said chambers in successive order when the same become explosion chambers.

4. An internal combustion engine comprising a cylinder, an oscillatory piston mounted therein, and means also mounted within the cylinder and coöperating with the piston to form separated chambers within the cylinder in combination with a single valve, a plurality of ports controlled thereby and respectively communicating with said chambers, and means for operating said valve to open said ports in successive order, said valve operating to simultaneously uncover adjacent ports.

5. In an internal combustion engine, a cylinder, a piston having radial wings journaled to oscillate within said cylinder, vanes arranged within said cylinder between said piston wings to form separated chambers on opposite sides of each piston wing, a plurality of ports located in said cylinder and respectively communicating with said chambers and a single valve to control all of said ports, said valve operating to close one port coincidently with the opening of the next adjacent port.

6. In an internal combustion engine, a cylinder, a shaft extending centrally therethrough, a piston carried by said shaft and having radially extending wings, vanes carried by the interior wall of the cylinder and positioned between said wings, said cylinder having a port opening on each side of each vane, a single rotary valve having supply and exhaust ports and operating to control all of said port openings, said valve operating to close a cylinder port to the supply coincidently with the opening of the next adjacent cylinder port to exhaust.

7. In an internal combustion engine, a cylinder having peripheral port openings, an oscillatory piston journaled within said cylinder and having radial wings, said port openings communicating with said cylinder at points on the respectively opposite sides of said piston wings, a valve sleeve surrounding said cylinder and having port openings therethrough to control the cylinder ports and means for rotating said sleeve.

8. In an internal combustion engine, a casing including end caps, a cylinder positioned between said caps, a valve sleeve surrounding the cylinder and having a peripheral gearing, port openings respectively in said cylinder and valve sleeve, an oscillatory piston journaled in said cylinder, a rotary drive shaft connection between said piston and shaft for rotating the latter and a gear actuated by said shaft to rotate said valve sleeve.

9. An internal combustion engine comprising a cylinder having means therein to separate the same into chambers, a shaft journaled in said cylinder, a piston carried by said shaft and coöperating with said separating means to close said chambers, said piston having wings extending into said chambers, means for successively making each of said chambers a suction, compression, explosion and expansion chamber, a single valve for admitting an explosive mixture alternately to said chambers on opposite sides of said piston wings, and means for firing the explosive mixtures whereby said piston is oscillated.

10. In an internal combustion engine a cylinder, a piston having radial wings journaled to oscillate within said cylinder vanes, arranged within said cylinder, between said piston wings to form separated chambers on opposite sides of each piston wing, means whereby each of said chambers becomes successively a suction, compression explosion and expansion chamber, a plurality of ports located in said cylinder and respectively communicating with said chambers and a single valve to control all of said ports.

In testimony whereof I have hereunto set my hand on this 1st day of June, A. D. 1915.

WILLIAM BARBER.